Figure 1:
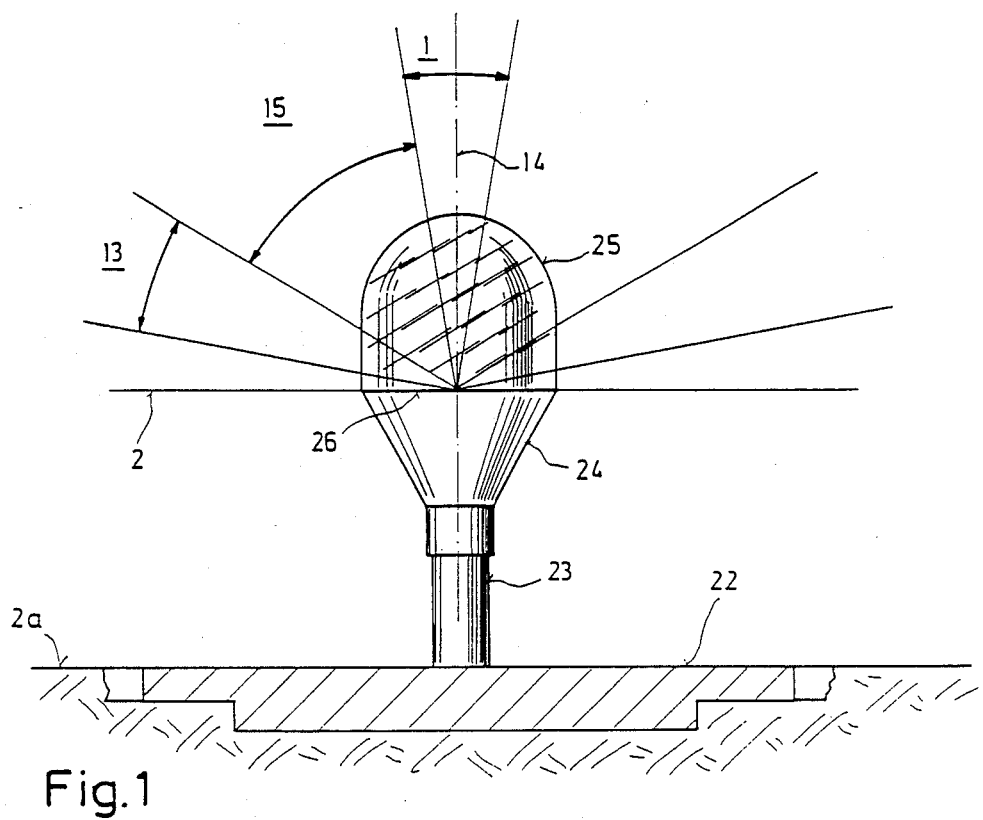

United States Patent [19]
Vadseth

[11] Patent Number: 4,910,649
[45] Date of Patent: Mar. 20, 1990

[54] AIRFIELD LIGHT HAVING A LIGHT SOURCE ARRANGED IN A HOUSE

[75] Inventor: Jan E. Vadseth, Sevelen, Switzerland

[73] Assignee: Meta-Fer AG, Buchs, Switzerland

[21] Appl. No.: 168,903

[22] Filed: Mar. 16, 1988

[30] Foreign Application Priority Data

Mar. 16, 1987 [CH] Switzerland ............... 00975/87

[51] Int. Cl.⁴ .................................................. F21V 5/00
[52] U.S. Cl. ................................. 362/145; 362/309;
362/327; 362/332; 362/336
[58] Field of Search ............... 362/153, 267, 326, 327,
362/328, 332, 62, 363, 336, 335, 268, 145, 153.1,
309; 340/953, 972

[56] References Cited

U.S. PATENT DOCUMENTS

| | | | |
|---|---|---|---|
| 1,834,041 | 12/1931 | Barton | 362/268 |
| 1,955,602 | 4/1934 | Lamblin-Parent | 362/268 |
| 2,254,961 | 9/1941 | Harris | 362/327 |
| 2,586,374 | 2/1952 | Pennow | 362/268 |
| 3,999,054 | 12/1976 | Dorman | 362/299 |
| 4,054,792 | 10/1977 | Brudy | 362/267 |
| 4,104,711 | 8/1978 | Carter | 362/363 |
| 4,499,527 | 2/1985 | Tauber et al. | 362/153 |
| 4,521,836 | 6/1985 | Puttemanns et al. | 362/267 |
| 4,638,411 | 1/1987 | Trainor | 362/267 |

FOREIGN PATENT DOCUMENTS

| | | | |
|---|---|---|---|
| 25639 | 3/1930 | Australia | 362/145 |
| 625143 | 8/1961 | Canada | 362/267 |
| 1125858 | 3/1962 | Fed. Rep. of Germany | . |
| 1497339 | 7/1969 | Fed. Rep. of Germany | . |
| 574982 | 1/1946 | United Kingdom | 362/284 |
| 1109988 | 4/1968 | United Kingdom | 362/332 |

*Primary Examiner*—Stephen F. Husar
*Assistant Examiner*—D. M. Cox
*Attorney, Agent, or Firm*—Cushman, Darby & Cushman

[57] ABSTRACT

The invention relates to an airfield light, principally for marking aircraft parking lots, routes for ground staff, etc. It should be readily visible from all sides and from any angle, even in the poorest environmental conditions and from a relatively long distance. It consists of a light source which is arranged in a housing and radiates light in a hemisphere through at least one lens installed in the housing, the light beam (1) in the zenith of the hemisphere having a luminous intensity which is at least 20 percent higher than in the region (13) between 10 and 30 degrees above the lowermost radiant edge (2).

14 Claims, 3 Drawing Sheets

AIRFIELD LIGHT HAVING A LIGHT SOURCE ARRANGED IN A HOUSE

The invention relates to an airfield light according to the preamble of claim 1. Airfield lights of this type have long been known and are mainly used for marking aircraft parking lots, routes for ground crew, etc. They should be easily detectable from all sides and from any angle of view.

German Patent 1,125,858, German Auslegeschrift 1,497,339 and U.S. Pat. No. 3,999,054 each describe slightly different airfield lighting units of this type. They are very flat and scarcely project above the runway surface. This is very advantageous since these airfield lights can be driven over and, for example, can scarcely be damaged by snowplows during clearing of snow.

Another type of airfield lights which transmit light in all directions is described in U.S. Pat. No. 4,104,711. In this type, an upper lamp part is connected to a lower lamp part, the lower lamp part being anchored to a baseplate via a stand. Although this type of design has the advantage of projecting from the snow in the event of snow cover, it also has the disadvantage that it cannot be driven over and hinders snow clearance.

Under normal weather conditions, the known airfield lights are more or less readily visible. However, it has been found that in unfavorable environmental conditions, such as snowfall, rain, fog, dust storms, etc., and particularly in the regions lying just above the ground, the light is reflected and scattered to such an extent that it may be impossible to recognize a clear line of airfield lighting units or a path between such lines, relatively large areas of space being immersed in more or less diffuse light. Orientation on the basis of such lights, in particular from relatively large distances, is therefore difficult.

It is the object of the invention to provide an airfield light which permits orientation even under the poorest environmental conditions and even from a relatively large distance and, despite highly reflecting or light-scattering elements in the air, is capable of giving a clear picture of the location of the lighting units.

This object is satisfactorily achieved for the first time by the defining clause of claim 1.

The invention utilizes, inter alia, the discovery that fog and dust are the most frequent sources of problems regarding poor visibility and reflect or scatter light to different extents in different layers. Furthermore, the invention makes use of the observation that, in tracking light signals in very poor visibility conditions, people look into the distance and always set their line of view somewhat above the horizon.

Without dazzling under normal light conditions, it is thus possible for the first time clearly to mark, for example, parking lots for aircraft or the routes described above, even in poor visibility conditions. The strong beam in the middle has only a very narrow angular spread, so that this beam itself could dazzle only if viewed directly from above. However, the areas of parking lots and the like are separated from the airfields in such a way that, under normal circumstances, a pilot cannot be in a position to observe these airfield lights from above, with the result that the danger of unintentional dazzling is excluded. According to the invention, the same beam has the advantage that a sort of light pole is visible above the airfield lighting unit and clearly projects from the diffuse blurred sea of light close to the ground. Since these beams do not intersect those of the other airfield lighting units, as invariably occurs with the all-round beams according to the invention which are weaker, effects due to accidental light maxima, which likewise may lead to erroneous orientation, are also avoided.

Further features and embodiments of the invention are described in the defining clauses of the subclaims.

Light beams in the zenith which are detectable at a particularly high level are achieved by the feature of claim 2; in the case of non-parallel beams, an angular range of not more than plus/minus 10 degrees, but preferably plus/minus 5 degrees (measured from the vertical) is optimum.

If, according to the defining clause of claim 4, the luminous intensity in the region adjacent to the beam is reduced to about half of that in the region between 10 and 30 degrees above the ground, under normal visibility conditions the dazzle effect close to the airfield lighting unit for persons driving or walking past is absent or reduced and at the same time the energy requirement is reduced, so that in general substantially better overall visibility is achieved with an energy consumption which is about the same as that for conventional airfield lighting installations.

The embodiment according to the invention is preferably used in flat airfield lights according to the three preliminary publications cited at the outset, the lens of the said lights corresponding to the defining clause of claim 9. The embodiment of the Fresnel lens according to the invention ensures a high luminous efficiency.

The embodiment of the Fresnel lens according to claim 13 requires relatively little lens material but results in relatively large divergence of the beam in the zenith, whereas the embodiment according to claim 8 requires somewhat more lens material but gives a substantially narrower and intenser beam in the zenith.

The feature of claim 11 permits relatively little lens material in conjunction with a good fit in the housing, any light losses at the fitting surfaces being reduced. The angle depends principally on the refractive index of the lens material. In the present invention, experiments showed that a refractive index of 1.47 was optimum.

If the fitting surfaces, as defined in claim 5, are provided with a reflective coating, the major part of the light will certainly be passed through the lens.

A housing according to claim 11 is relatively uncomplicated and has good reflectivity, while a variant according to claim 7 has a more complicated construction but ensures even greater utilization of light.

Figure 2:
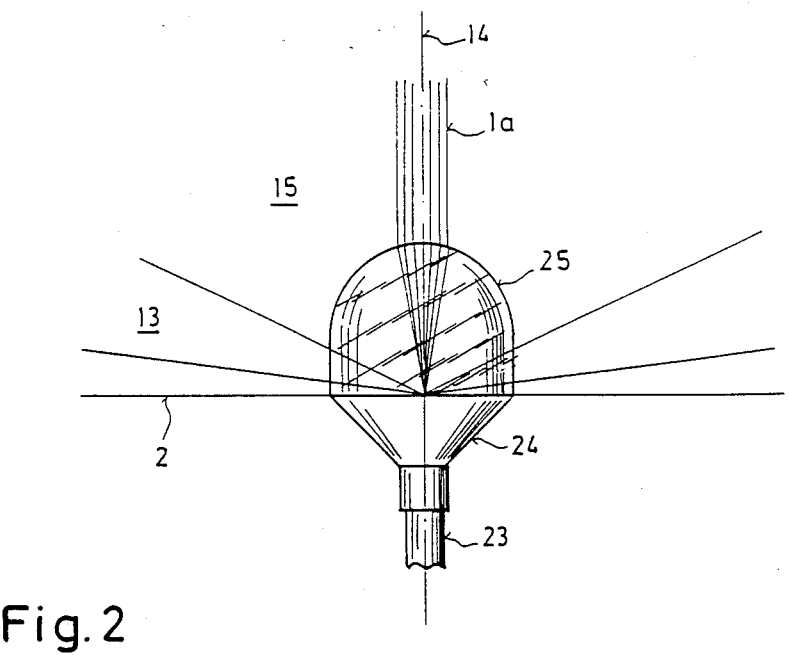
Figure 3:
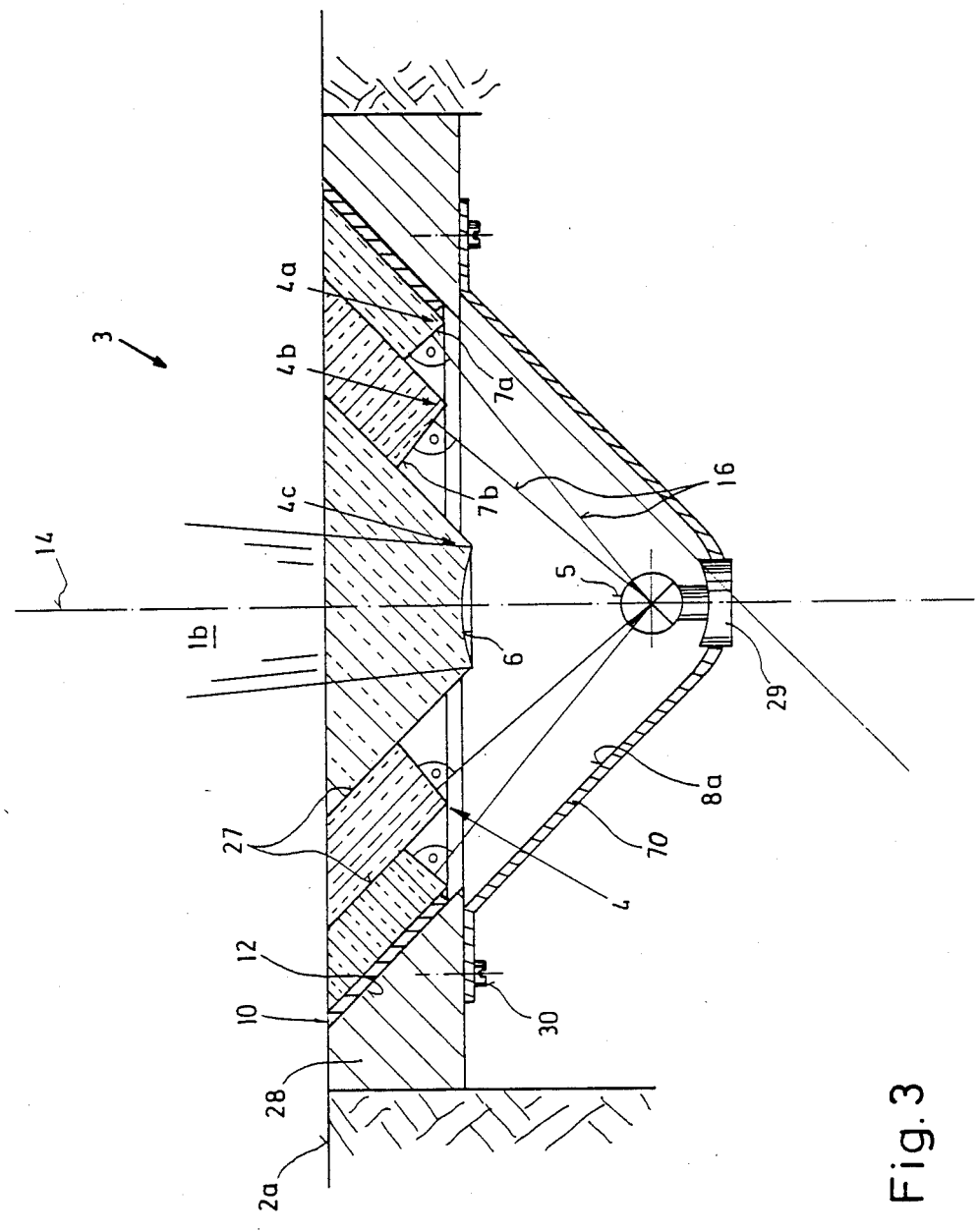
Figure 4:
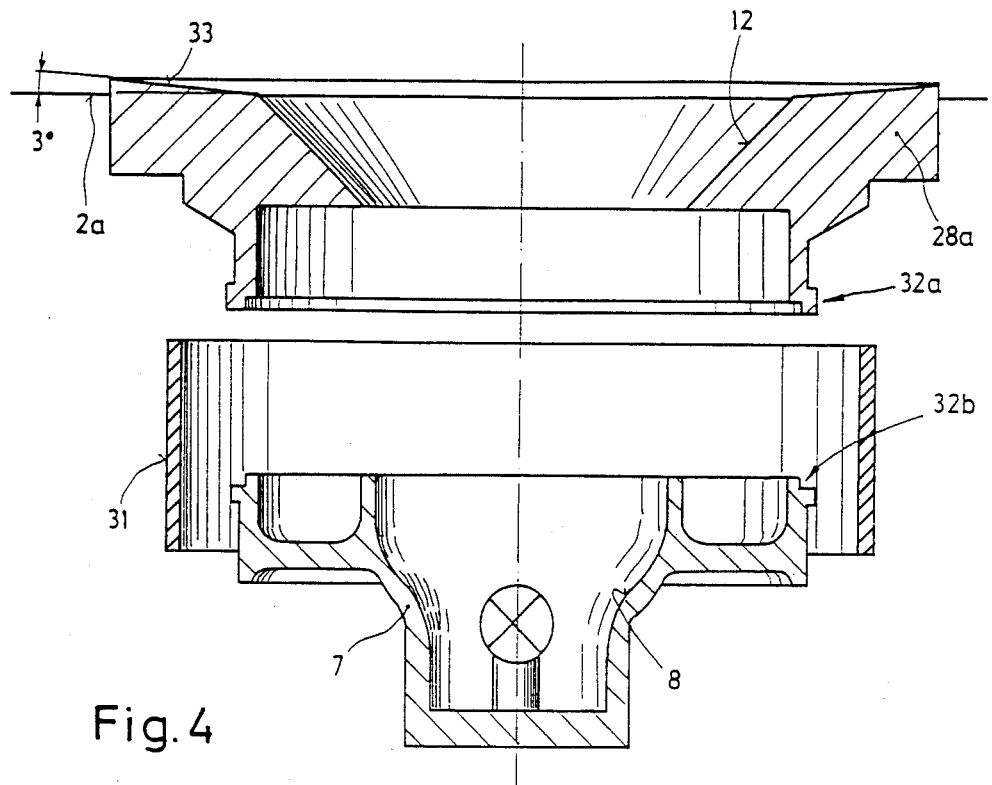
Figure 5:
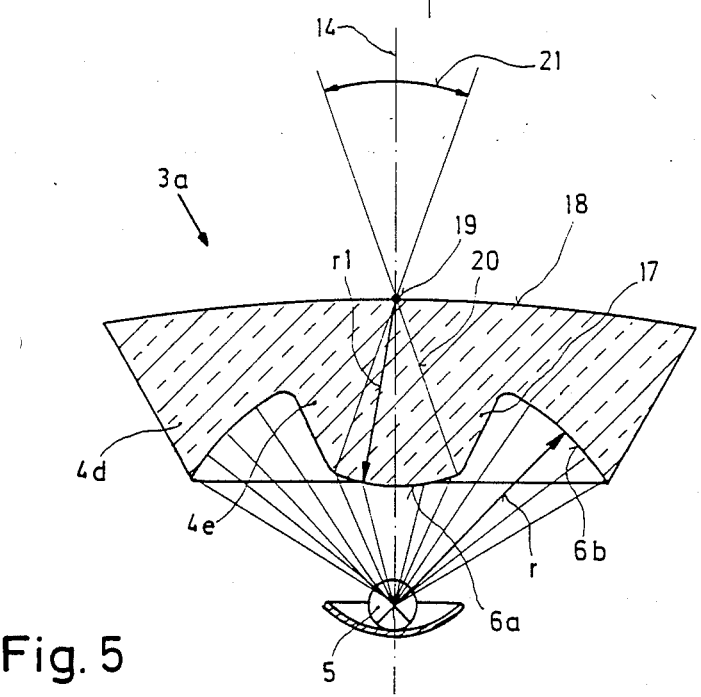

The invention will be described in detail for an example, with reference to the drawing, in which FIG. 1 shows an airfield light which projects from the ground and has a strong divergent beam in the middle, FIG. 2 shows a similar airfield light having a strong beam of parallel focused light in the middle, FIG. 3 shows a Fresnel lens according to the invention for an airfield light flush with the ground, FIG. 4 shows a housing for such a Fresnel lens and FIG. 5 shows a second variant of a Fresnel lens.

FIG. 1 shows a conventional airfield light which is anchored by means of a stand 23 to a base 22 let into the ground 2a. The airfield light has a lower lamp part 24, which is connected to an upper lamp part 25 in the form of a lens. The join between the lower lamp part 24 and the upper lamp part 25 corresponds to an opening line 26, which lies in a lower light emergence level, at a lower light emergence edge 2.

The upper part 25 of the lamp is produced, by known measures which are therefore not shown in detail, in such a way that radiated light is propagated in a hemisphere but, according to the invention, different luminous intensities are achieved in certain regions: A region 13 between 10 and 30 degrees above the radiating edge 2 has a luminous intensity which is at least 20% lower than that of a region containing a light beam 1, which radiates upward through the zenith of the upper part 25 of the lamp, in an angular region of not more than plus/minus 10 degrees from the vertical 14. A region 15 between this beam 1 and the region 13 is provided wih a luminous intensity which is only half that of the region 13. As a result, the airfield light can be easily seen at a very shallow angle, i.e. for example from a large distance from the ground, and the luminous intensity is apparently reduced (to about half) for an observer on approaching the airfield light, so that there is no dazzle effect. The beam in the middle ensures that clearly delimited light is projected upward, with the result that, for example, aircraft waiting above can be marked. Moreover, the strong beam 1 provides good visibility of the light in fog, snow or dust-containing air through reflection of the light by the fog, snow or dust particles up to relatively great heights above the airfield light.

FIG. 2 shows a similar type of airfield light, the strong beam 1a in the zenith consisting of parallel focused light. Parallel focusing reduces scatter at relatively great altitudes, with the result that an aircraft light of this type radiates light to even higher regions above the airfield.

Another type of airfield light is shown in FIG. 3. In this embodiment, there are no structural elements projecting above the ground 2a. The upper part of the lamp is in the form of a Fresnel lens 3 which is flat on the outside and whose zones 4 are provided on that side of the lens 3 which faces a light source 5. This embodiment provides a total of three zones 4a, 4b and 4c, which are in the form of concentric annular segments and are adhesively bonded to one another. The Fresnel lens 3 tapers conically from its periphery 10 to the center or to the light source 5, and the annular segments are conical at their contact or bonded surfaces 27. The outer zones 4a and 4b are each provided with a surface 7a and 7b, respectively, for incident light, the said surfaces being at right angles to the incident light beams 16 from the light source 5. As a result, the light beams in these sections enter the lens virtually without refraction and merely undergo refraction corresponding to the refractive index of the lens material, at the surface of the lens 3, in the direction of the ground 2a. This makes it possible to achieve radiant angles down to below 3 degrees from the ground 2a. The middle projection 4c has a concave curvature 6. Because of this curvature, light from the light source 5 is focused into a beam 1b, which is radiated upward at an angle of plus/minus 5 degrees to the vertical 14. Because of its design, the zone 4c is closer to the light source, with the result that the beam 1b is more powerful than the other light beams emerging. The lens 3 is bonded to the holding surfaces 12 of a prism holder 28 in a diametrically opposed conical fitting. The holding surfaces 12 are provided with a reflective coating. The light source 5 is replaceably mounted on a base 29 which is placed in a parabolic mirror 70 whose inside 8a is provided with a reflective coating and if necessary anodized. The parabolic mirror 70 is screwed to the prism holder 28 by means of screws 30.

FIG. 4 shows another variant of the housing of the airfield light prior to assembly, the said housing consisting of a prism holder 28a, which can be connected to a housing 7 by means of shrink sleeve 31, the prism holder 28a and the housing 7 each having an overlapping collar 32a and 32b, which can be placed together so that they overlap without play. The housing 7 consists of cast aluminum, is anodized on its inside 8 and is provided with a reflective coating. The prism holder 28a tapers slightly in its region around the holding surfaces 12 for the Fresnel lens, forming an annular projection 33, which protects the lens from damage, for example by a snowplow. The projection 33 is no more than 1-3 mm high, and the ascending flank forms an angle of no more than 3 degrees with the ground 2a.

The Fresnel lens 3a shown in FIG. 5 has only two zones 4d and 4e, the middle zone, zone 4e, having a convex curvature 6a. The zone 4d has a concave curvature 6b, all points on this concave surface being the same distance r away from the light source 5. The convex curvature 6a is such that—as a result of the radius r1—the focal point 19 of zone 4e is in the center of the surface 18 of the lens 3a. The beams 20 focused by the convex curvature 6a have a maximum scattering angle 21 of 20 degrees.

The Figures shown and the description of these Figures do not in any way restrict the invention. Thus, any optical systems which, for example, are covered by a neutral glass cover may be provided. What is important is the form of the light beams and the radiation conditions themselves. The technical knowledge of an optician embraces a very wide variety of possibilities for this purpose, which need not be discussed in detail.

What is claimed:

1. An airfield light comprising:

a housing;

at least one lens mounted to said housing;

a single source of light mounted within said housing, said source of light emitting light in a hemisphere;

the light emitted by said source of light passing through said at least one lens, said at least one lens distributing the emitted light as a light beam having a luminous intensity in the zenith of the hemisphere of emitted light which is at least 20% higher than the luminous intensity thereof in the region between 10 and 30 degrees above the lowermost radiant edge of the light beam or above the ground and wherein the luminous intensity of the light beam from the region between 30 degrees above the lowermost radiant edge of the light beam or above the ground and the zenith is about one-half of the luminous intensity in said region between 10 and 30 degrees.

2. An airfield light as claimed in claim 1, wherein the beam in the zenith consists of parallel focused rays. (FIG. 2)

3. An airfield light as claimed in claim 1, wherein the beam in the zenith covers an angular range of not more than ±10 degrees as measured from vertical.

4. An airfield light as claimed in claim 1 wherein a second region of lower luminous intensity which is preferably no more than half as high as that in the region from 10 to 30 degrees above the ground is provided between the region from 30 degrees above the lowermost radiant edge or above the ground and the beam in the zenith (FIGS. 1, 2)

5. An airfield light as claimed in claim 1 wherein the housing and/or the holding surfaces for the Fresnel lens and/or those inner surfaces of the housing which face the lens is or are provided with a reflective coating. (FIG. 4)

6. An airfield light as claimed in claim 1 wherein the housing consists of cast aluminum, and the inner surfaces are anodized and may be polished. (FIG. 4)

7. An airfield light as claimed in claim 1 wherein a parabolic reflector is provided behind the light source. (FIG. 3)

8. A airfield light as in claim 1, wherein in the region between 10 and 30 degrees above the lowermost radiant edge of the light beam or above the ground, the light beam is distributed horizontally through an angle of about 360 degrees.

9. An air field light having a light source which is arranged in a housing and radiates light in a hemisphere through at least one lens inserted in the housing, wherein the light beam in the zenith of the hemisphere has a luminous intensity which is at least 20% higher than in the region between 10 and 30 degrees above the lowermost radiant edge of the airfield light or above the ground, the lens being in the form of a Fresnel lens having zones in facing relation to the light source and a flat surface on a side thereof opposite the zones, the flat surface being disposed in the plane of the surrounding ground.

10. An airfield light as claimed in claim 9, wherein at least one—preferably three—of the zones has a surface which faces the light source and extends at right angles to the light beam incident on the surface from the light source.

11. An airfield light as claimed in claim 10 wherein the lens is conical along its circumference, the slope of the cone, viewed in cross-section, forming an angle of 30–60, preferably of 40–50, degrees with the vertical. (FIG. 3)

12. An airfield light as claimed in claim 10, wherein the inside of the lens possess, in the center, a curvature whose radius corresponds to the closest distance between the light source and the lens.

13. An airfield light as claimed in claim 9, wherein the inside of the lens possesses, in the center, a curvature whose radius corresponds to the closest distance between the light source and the lens. (FIG. 3)

14. An airfield light as claimed in claim 9, wherein the inside of the lens possesses, in the center, a convex curvature which is preferably formed on a projection and whose focal point for its focused beams is located on the surface of the lens, the angle between the outermost focused beams being no more than 20 degrees. (FIGS. 3, 5)

* * * * *